United States Patent
Ganji et al.

(10) Patent No.: US 10,742,282 B2
(45) Date of Patent: Aug. 11, 2020

(54) SYSTEM AND METHOD FOR GENERATING CODEBOOK FOR ANALOG BEAMFORMING

(71) Applicant: Samsung Electronics Co., Ltd., Suwon-si, Gyeonggi-do (KR)

(72) Inventors: Mehdi Ganji, Irvine, CA (US); Hongbing Cheng, San Diego, CA (US); Kee-Bong Song, San Diego, CA (US); Qi Zhan, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/354,024

(22) Filed: Mar. 14, 2019

(65) Prior Publication Data
US 2020/0136694 A1    Apr. 30, 2020

Related U.S. Application Data
(60) Provisional application No. 62/752,666, filed on Oct. 30, 2018.

(51) Int. Cl.
| | | |
|---|---|---|
| *H04B 7/04* | (2017.01) | |
| *H04B 7/06* | (2006.01) | |
| *H04B 7/0456* | (2017.01) | |

(52) U.S. Cl.
CPC ......... *H04B 7/0482* (2013.01); *H04B 7/0617* (2013.01)

(58) Field of Classification Search
CPC .. H04B 7/0639; H04B 7/0695; H04B 7/0478; H04B 7/0482; H04B 7/0617
See application file for complete search history.

(56) References Cited

U.S. PATENT DOCUMENTS
| | | |
|---|---|---|
| 7,949,064 B2 | 5/2011 | Lin et al. |
| 8,254,486 B2 | 8/2012 | Shi et al. |

(Continued)

FOREIGN PATENT DOCUMENTS
| | | |
|---|---|---|
| CN | 101854223 A | 10/2010 |
| CN | 105897316 A | 8/2016 |

(Continued)

OTHER PUBLICATIONS
Ahmed Alkhateeb and Iz Beltagy "Machine Learning for Reliable mmWave Systems: Blockage Prediction and Proactive Handoff", Arizona State University, Allen Institute for Artificial Intelligence, Jul. 7, 2018 (Year: 2018).*

(Continued)

*Primary Examiner* — Aristocratis Fotakis
(74) *Attorney, Agent, or Firm* — Lewis Roca Rothgerber Christie LLP

(57) ABSTRACT

A method of designing a codebook for analog beamforming. In some embodiments, the method includes: generating a plurality of training points, based on a predefined distribution, each training point being a channel vector; generating, for each of a plurality of codewords, a respective initial value; assigning, in a first assignment operation, each of the training points to a respective desired codeword, the desired codeword maximizing a metric function of a beamforming gain for the training point over the codewords; updating, in a first updating operation, each of the codewords according to the training points assigned to it; and determining whether convergence is achieved; and in response to determining that convergence is achieved, determining a final codebook.

20 Claims, 3 Drawing Sheets

(56) References Cited

U.S. PATENT DOCUMENTS

| | | | |
|---|---|---|---|
| 8,320,275 B2 | 11/2012 | Zhang et al. | |
| 8,626,104 B2 | 1/2014 | Huang et al. | |
| 8,749,408 B1 | 6/2014 | Li | |
| 8,971,467 B2 | 3/2015 | Mielczarek et al. | |
| 9,048,891 B2 | 6/2015 | Mielczarek et al. | |
| 9,155,097 B2 | 10/2015 | Li et al. | |
| 9,729,215 B2 | 8/2017 | Rahman et al. | |
| 9,872,296 B2 | 1/2018 | Raghavan et al. | |
| 10,505,616 B1* | 12/2019 | Chen | H04B 7/0639 |
| 2009/0046807 A1 | 2/2009 | Xia et al. | |
| 2009/0121935 A1* | 5/2009 | Xia | H01Q 3/2605 |
| | | | 342/377 |
| 2010/0035627 A1* | 2/2010 | Hou | H04B 7/024 |
| | | | 455/452.2 |
| 2013/0058383 A1* | 3/2013 | Alexiou | H04B 7/0639 |
| | | | 375/219 |
| 2016/0072562 A1 | 3/2016 | Onggosanusi et al. | |
| 2016/0119045 A1 | 4/2016 | Rahman et al. | |
| 2018/0248596 A1* | 8/2018 | Xiao | H04B 7/0456 |
| 2018/0331740 A1* | 11/2018 | Orhan | H04B 17/327 |
| 2019/0044756 A1* | 2/2019 | Zhao | H04B 17/382 |
| 2019/0222275 A1* | 7/2019 | Mo | H04B 7/0482 |
| 2019/0372644 A1* | 12/2019 | Chen | H04B 17/309 |
| 2019/0386727 A1* | 12/2019 | Jeon | H04B 7/0617 |
| 2019/0393945 A1* | 12/2019 | Cavalcante | H03M 7/3059 |
| 2020/0021039 A1* | 1/2020 | Pelletti | H01Q 1/38 |

FOREIGN PATENT DOCUMENTS

| | | |
|---|---|---|
| CN | 106898357 A | 6/2017 |
| WO | 2007/022330 A2 | 2/2007 |
| WO | 2008/157646 A2 | 12/2008 |
| WO | 2011/026231 A1 | 3/2011 |

OTHER PUBLICATIONS

Wei Huang, Yongming Huang, Shiwen He, Luxi Yang,"Wideband Millimeter Wave Communication: Single Carrier Based Hybrid Precoding With Sparse Optimization", Southeast University, Huaqiao University, Central South University, China, Oct. 18, 2018 (Year: 2018).*

Liang Zhou, et al., "Fast Codebook-Based Beamforming Training for mmWave MIMO Systems with Subarray Structures", IEEE 82nd Vehicular Technology Conference (VTC2015-Fall), Sep. 6-9, 2015, pp. 1-5, Boston, MA.

Alkhateeb, A. et al., "Channel estimation and hybrid precoding for millimeter wave cellular systems," IEEE Journal of Selected Topics in Signal Processing, Oct. 2014, vol. 8, No. 5, pp. 831-846, IEEE.

Chen, J.C., "Efficient codebook-based beamforming algorithm for millimeter-wave massive MIMO systems," IEEE Transactions on Vehicular Technology, Sep. 2017, vol. 66, No. 9, pp. 7809-7817.

Chen, L. et al., "Multi-stage beamforming codebook for 60GHz WPAN," Communications and Networking in China (CHINACOM), 2011 6th International ICST Conference, Aug. 2011, pp. 361-365.

Choi, J. et al., "Advanced limited feedback designs for FD-MIMO using uniform planar arrays," in Global Communications Conference (GLOBECOM), IEEE, 2015, 6 pages El Ayach, O. et al., "Spatially sparse precoding in millimeter wave MIMO systems," IEEE transactions on wireless communications, Mar. 2014, vol. 13, No. 3, pp. 1499-1513.

Fuchs, B., "Application of convex relaxation to array synthesis problems," IEEE Transactions on Antennas and Propagation, Feb. 2014, vol. 62, No. 2, pp. 634-640.

He, T. et al., "Suboptimal beam search algorithm and codebook design for millimeter-wave communications," Mobile Networks and Applications, Jan. 25, 2015, 13 pages, Springer Science+ Business Media.

Hsu, K.N. et al., "Low complexity hybrid beamforming and precoding for 2D planar antenna array mmWave systems," in Signal Processing Systems (SiPS), 2015 IEEE Workshop, 2015, 6 pages, IEEE.

Hur, S. et al., "Millimeter wave beamforming for wireless backhaul and access in small cell networks," IEEE transactions on communications, Oct. 2013, vol. 61, No. 10, pp. 4391-4403, IEEE.

Kutty, S. et al., "Beamforming for millimeter wave communications: An inclusive survey", IEEE Communications Surveys & Tutorials, 2016, vol. 18, No. 2, pp. 949-973.

Liang, J. et al., "Phase-only pattern synthesis for linear antenna arrays," IEEE Antennas and Wireless Propagation Letters, 2017, vol. 16, pp. 3232-3235.

Lloyd, S., "Least squares quantization in PCM," IEEE transactions on information theory, Mar. 1982, vol. 28, No. 2, pp. 129-137, IEEE.

Raviteja, P. et al., "Analog beamforming with low resolution phase shifters," IEEE Wireless Communications Letters, 2017, 5 pages, IEEE.

Seleem, H. et al., "Hybrid precoding-beamforming design with hadamard RF codebook for mmWave large-scale MIMO systems," IEEE Access, 2016, 11 pages, IEEE.

Song, J. et al., "Codebook design for hybrid beamforming in millimeter wave systems," Millimeter-wave Communications, IEEE ICC 2015 SAC, 2015, pp. 1298-1303, IEEE.

Song, J. et al., "Common codebook millimeter wave beam design: Designing beams for both sounding and communication with uniform planar arrays," IEEE Transactions on Communications, Apr. 2017, vol. 65, No. 4, pp. 1859-1872, IEEE.

Stutzman, W.L. et al., "Antenna theory and design", Third Edition, 2013, 843 pages, John Wiley & Sons, Inc.

Wang, J. et al., "Beam codebook based beamforming protocol for multi-Gbps millimeter-wave WPAN systems," IEEE Journal on Selected Areas in Communications, 2009, 7 pages, IEEE.

Wang, Z. et al., "Hybrid precoder and combiner design with low resolution phase shifters in mmWave MIMO systems," IEEE Journal of Selected Topics in Signal Processing, 2018, 12 pages.

Xiao, Z. et al., "Codebook design for millimeter-wave channel estimation with hybrid precoding structure," IEEE Transactions on Wireless Communications, 2017, pp. 1-14.

Xiao, Z. et al., "Hierarchical codebook design for beamforming training in millimeter-wave communication," IEEE Transactions on Wireless Communications, 2016, pp. 1-13.

Yu, X. et al., "Alternating minimization algorithms for hybrid precoding in millimeter wave MIMO systems." J. Sel. Topics Signal Processing, 2016, pp. 1-16.

Zhang, J., "Codebook design for beam alignment in millimeter wave communication systems," IEEE Transactions on Communications, Nov. 2017, vol. 65, No. 11, pp. 4980-4995.

* cited by examiner

SYSTEM AND METHOD FOR GENERATING CODEBOOK FOR ANALOG BEAMFORMING

CROSS-REFERENCE TO RELATED APPLICATION(S)

The present application claims priority to and the benefit of U.S. Provisional Application No. 62/752,666, filed Oct. 30, 2018, entitled "CODEBOOK DESIGN FOR ANALOG BEAMFORMING", the entire content of which is incorporated herein by reference.

FIELD

One or more aspects of embodiments according to the present disclosure relate to wireless communication systems, and more particularly to a system and method for generating a codebook for analog beamforming.

BACKGROUND

In a radio frequency (RF) receiving or transmitting system with an array of antennas for frequency-division multiplexed communications, when only one RF chain is available, entry-wise elements of the channel may not be accessible. Instead, in each time or frequency resource, a linear combination of the elements may be obtained. This may be the case, for example, in a system for millimeter-wave (mm-wave) communications, in which the high power consumption of mixed signal components, and the high cost of RF chains, may make it costly to realize digital baseband beamforming, of the kind that may be used in lower-frequency multiple-input multiple-output (MIMO) systems. In such a system for mm-wave communications, analog beamforming may instead be used; all the antennas (of the array) may share a single RF chain and have weights of the same amplitude, i.e., a constant-amplitude constraint may apply to their weights.

The linear combination may be obtained using a phase shifter vector that may be referred to as a beamforming codeword; a set of such vectors, one for each beam to be formed, may be referred to as a beamforming codebook. The codebook may be represented as an array, each column of the array being a codeword corresponding to a respective beamforming codeword.

SUMMARY

In some embodiments of the present disclosure, there is provided a method of designing a codebook for analog beamforming, the method including: generating a plurality of training points, each training point being a channel vector; generating, for each of a plurality of codewords, a respective initial value; assigning, in a first assignment operation, each of the training points to a respective desired codeword, the desired codeword maximizing a metric function of a beamforming gain for the training point over the codewords; and updating, in a first updating operation, each of the codewords according to the training points assigned to it, the updating including executing a plurality of iterations of a gradient descent updating rule.

In some embodiments, the generating of a plurality of training points includes generating a plurality of training points, based on a predefined distribution.

In some embodiments, the method further includes determining whether convergence is achieved.

In some embodiments, the method further includes, in response to determining that convergence is achieved, determining the codebook containing the updated codewords.

In some embodiments, the method further includes, in response to determining, after the first updating operation, that convergence is not achieved, assigning, in a second assignment operation, each of the training points to a respective desired codeword, the desired codeword maximizing a metric function of a beamforming gain for the training point over the codewords; and updating, in a second updating operation, each of the codewords according to the training points assigned to it.

In some embodiments, the determining whether convergence is achieved includes determining one from a combination of: whether a number of iterations equals a set number, whether a metric is larger than a set value; whether a change in a metric, between two successive iterations, is smaller than a set threshold; and whether a change in the plurality of codewords between two iterations is smaller than a set threshold.

In some embodiments, the generating, for each of the plurality of codewords, the respective initial value, includes performing a discrete Fourier transform.

In some embodiments, the metric function returns a measure selected from the group consisting of a measure of average beamforming gain, a measure of capacity, a measure of reciprocal bit error rate, a measure of coverage, and combinations thereof.

In some embodiments, the training points include one selected from a combination of: empirical points; points uniformly distributed over a sphere; pseudorandom points generated based on a uniform spherical distribution; points uniformly distributed over a range of horizontal angles and uniformly distributed over a range of down-tilt angles; and pseudorandom points generated based on a distribution that is uniform over a range of horizontal angles and uniform over a range of down-tilt angles.

In some embodiments, the updating, of a codeword of the plurality of codewords, includes updating a value of the codeword to: $w_k^{updated} = \mathrm{argmax}_w J_k(w)$, wherein:

$$J_k = \frac{1}{|\Omega_k|} \sum_{h_l \in \Omega_k} f(|w^H h_l|^2),$$

and $\Omega_k$ is the set of training points assigned to the codeword.

In some embodiments of the present disclosure, there is provided a system for communicating, including: a processing circuit; and an antenna system, including a plurality of antennas and a corresponding plurality of phase shifters, the processing circuit being configured to: generate a plurality training points, based on a predefined distribution, each training point being a channel vector; generate, for each of a plurality of codewords, a respective initial value; assign, in a first assignment operation, each of the training points to a respective desired codeword, the desired codeword maximizing a metric function of a beamforming gain for the training point over the codewords; and update, in a first updating operation, each of the codewords according to the training points assigned to it.

In some embodiments, the generating of a plurality of training points includes generating a plurality of training points, based on a predefined distribution.

In some embodiments, the processing circuit is further configured to determine whether convergence is achieved.

In some embodiments, the processing circuit is further configured to, in response to determining that convergence is achieved, determine the codebook containing the updated codewords.

In some embodiments, the processing circuit is further configured to: in response to determining, after the first updating operation, that convergence is not achieved, assign, in a second assignment operation, each of the training points to a respective desired codeword, the desired codeword maximizing a metric function of a beamforming gain for the training point over the codewords; and update, in a second updating operation, each of the codewords according to the training points assigned to it.

In some embodiments, the determining whether convergence is achieved includes determining one from a combination of: whether a number of iterations equals a set number; whether a metric is larger than a set value; whether a change in a metric, between two successive iterations, is smaller than a set threshold; and whether a change in the plurality of codewords between two iterations is smaller than a set threshold.

In some embodiments, the generating, for each of the plurality of codewords, the respective initial value, includes performing a discrete Fourier transform.

In some embodiments, the metric function returns one or more measures selected from a combination of: a measure of average beamforming gain, a measure of capacity, a measure of reciprocal bit error rate, and a measure of coverage.

In some embodiments, the training points include one selected from a combination of: empirical points; points uniformly distributed over a sphere; pseudorandom points generated based on a uniform spherical distribution; points uniformly distributed over a range of horizontal angles and uniformly distributed over a range of down-tilt angles; and pseudorandom points generated based on a distribution that is uniform over a range of horizontal angles and uniform over a range of down-tilt angles.

In some embodiments, the updating, of a codeword of the plurality of codewords, includes updating a value of the codeword to: $w_k^{updated} = \text{argmax}_w J_k(w)$, wherein:

$$J_k = \frac{1}{|\Omega_k|} \sum_{h_l \in \Omega_k} f(|w^H h_l|^2),$$

and $\Omega_k$ is the set of training points assigned to the codeword.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
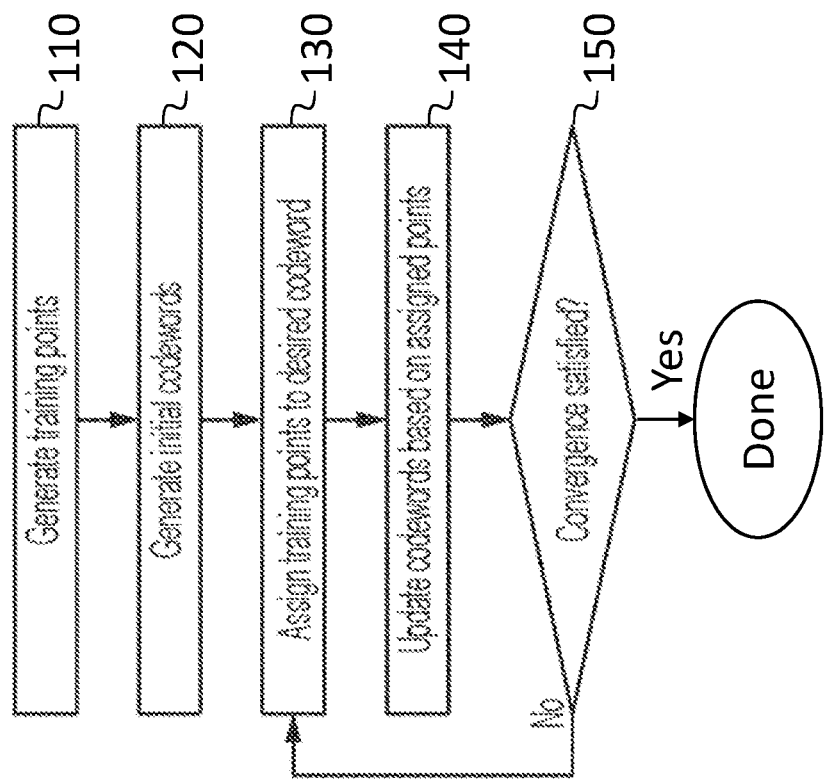
FIG. 1 is a flowchart of a method for generating a codebook, according to an embodiment of the present disclosure.

The detailed description set forth below in connection with the appended drawings is intended as a description of exemplary embodiments of a system and method for generating a codebook for analog beamforming provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

To form a codebook for analog beamforming, if sufficient time and/or frequency resources are available to sweep a sufficient number of beams, it may be possible to estimate the elements of the channel matrix and direct the beam direction toward an (approximate) significant eigenvector of the channel matrix. However, for an antenna array of large size, and if the available sweeping resources are limited, acquisition of the channel state information matrices may be challenging.

In an alternate method that may be referred to as "selection-based" beamforming, a set of codewords, i.e., a set of phase shifter vectors, is designed and used in the beam sweeping phase. After evaluating the codewords of the pre-designed codebook, one which optimizes a performance metric is chosen and used in successive transmissions.

Without loss of generality, the receiver side with antenna arrays of N elements may be considered; the same codebook may be used for transmit beamforming. It will be understood that although some embodiments are described herein in the context of a single antenna array and a single RF chain, the methods of codebook design described herein may readily be extended to multiple antenna arrays and multiple RF chains. The antenna array may have any shape, e.g., it may be a uniform linear array (ULA) or a uniform planar array (UPA).

The received signal may be written as:

$$y = \sqrt{P_{tot}} w_R^H h s + w_R^H n$$

where s denotes the transmitted symbol with unit power, $W_R$ is the N×1 receive beamforming vector, h is the N×1 channel vector and n is the Gaussian noise vector with power $N_0$ i.e., $E(nn^H) = N_0 I_N$.

The total power radiated from the transmitter is, thus, equal to $P_{tot}$ and the total transmission signal to noise ratio (SNR) may be defined as $$\delta_T = \frac{P_{tot}}{N_0}.$$

As such, the received SNR at the receiver may be defined as $\delta_R = \delta_T |w_R^H h|^2$, where the total beamforming power gain due to beamforming at the transmitter and the receiver may be denoted as:

$$G_B = \frac{\delta_R}{\delta_T} = |w_R^H h|^2.$$

The symbol W(N) may be used denote a set of vectors with N entries such that:

$$W(N) = \left\{ \frac{1}{\sqrt{N}} [e^{j\theta_1}, e^{j\theta_2}, \ldots, e^{j\theta_N}] \mid \theta_i \in [0, 2\pi), i = 1, \ldots, N \right\}$$

where $$\frac{1}{\sqrt{N}}$$

is a normalization rector such that all the vectors have unit power. Consequently, $w_R \in W(N)$. The non-convexity of this feasible set may be a factor making analog beamforming challenging. A subset of the feasible set may be selected as the codebook; this selection may be performed such that an overall performance metric obtained by beam sweeping and beam selection is sufficiently good.

One example of a codebook for a two-dimensional uniform planar array, which may be referred to as a "linear progressive" codebook, has the property that antenna ($m_h$, $m_v$) applies the following phase shifter rotation:

$$w_{m_h,m_v} = \frac{1}{\sqrt{n_h n_v}}$$
$$\exp\left(-j2\pi\left((m_v-1)\frac{d_v}{\lambda}\cos(\theta_{etilt}) + (m_h-1)\frac{d_h}{\lambda}\sin(\theta_{etilt})\sin(\phi_{escan})\right)\right)$$
$$m_h = 1, \ldots, n_h m_v = 1, \ldots, n_v$$

where $n_h$ and $n_v$ are the number of antenna elements in the horizontal and vertical directions, respectively, $\theta_{etilt}$ is the electrical down-tilt steering angle, and $\phi_{escan}$ is the electrical horizontal steering angle. As used herein, the "down-tilt" angle is the angle of declination (or angle of depression) (measured from the horizontal), i.e., it is the opposite of the elevation angle of the same direction. As used herein, the "horizontal" angle is the azimuth angle, measured from an axis of the antenna (e.g., measured from an axis that is perpendicular to the plane of the antenna, for a planar antenna array). The peak direction of the beam pattern may be at $\theta_{peak} = \theta_{etilt}$, $\phi_{peak} = \phi_{escan}$, with isotropic antenna elements.

If $m_h = 1$, the two-dimensional array will reduce to a uniform linear array with $n_v$ antenna elements and the linear progressive codebook simplifies to a codebook that may be referred to as a discrete Fourier transform (DFT) codebook:

$$w_{m_v} = \frac{1}{\sqrt{n_v}}\exp\left(-j2\pi(m_v-1)\frac{d_v}{\lambda}\cos(\theta_{etilt})\right)$$
$$m_v = 1, \ldots, n_v$$

where $\theta_{etilt}$ is the peak direction of the beam pattern. Codebook design with linear progressive or DFT codewords may consist of (e.g., include) finding the peak points of beam patterns $\theta_{etilt}$, $\phi_{escan}$ such that the codebook satisfies some criteria.

In some embodiments, a codebook is generated, without imposing any particular structure on the beam vectors and their patterns, such that the codebook maximizes the following metric:

$$J = E_h\left\{f\left(\max_{k=1,\ldots,K} |w_k^H h|^2\right)\right\}$$
$$\text{s.t. } w_k(n) = e^{j\theta_k(n)}, n = 1, \ldots, N$$

where maximization is over the codewords and the average is with respect to the channel vectors.

Instead of designing codewords with specific beam patterns, a learning-based method is used, in some embodiments, to design the codebook, based on selected training points. In some embodiments, the method proceeds as follows, as illustrated in FIG. 1. The present system generates L training points of $h_l$, $l=1, \ldots, L$ (at 110). The present system generates a plurality of initial values for a respective plurality of codewords, $w_k$, $k=1, \ldots, K$ (at 120). The present system assigns (at 130) each of the training points to a respective "desired" codeword using the assigning rule: $\max_{k=1, \ldots, K} |w_k^H h_l|^2$, $l=1, \ldots, L$. The present system updates (at 140) the codeword for each set of assigned training points. The present system outputs (at 150) the final codebook, $\{w_k\}$, $k=1, \ldots, K$ if convergence is achieved, if convergence is not achieved, the present system returns to the step of assigning (at 130) each of the training points to a respective "desired" codeword.

In some embodiments, the codebook that results from performing the present method maximizes the following metric:

$$J = E_h\left\{f\left(\max_{k=1,\ldots,K} |w_k^H h|^2\right)\right\}$$
$$\text{s.t. } w_k(n) = e^{j\theta_k(n)}, n = 1, \ldots, N$$

where maximization is over the codewords and the average is with respect to the channel vectors.

The training points may be empirical points obtained by measurements or drawn from some distribution based on the characteristics of the system. For example, measurements may be performed by transmitting a signal from a mobile antenna (or receiving a signal by a mobile antenna) of a mobile device, for a large number of positions of the mobile device, and, at each position, measuring the channel vector; each such measurement (performed at a respective mobile device position) may then correspond to one of the training points. In other embodiments, a set of training points based on uniform coverage (e.g., uniformly distributed over a sphere, or uniformly distributed in down-tilt angle (over a range of down-tilt angles) and horizontal angle (over a range of horizontal angles) may be used. Uniformly distributed training points may be uniformly spaced or randomly selected from a uniform distribution (e.g., each training point may be a pseudorandom point generated based on a uniform distribution (e.g., a uniform spherical distribution or a distribution that is uniform over a range of horizontal angles and uniform over a range of down-tilt angles)).

The generation of the initial values (at 120) may be performed by, for example, using a DFT codebook, or the codebook designed by other methods, such as a method described in Xiao, Z., He, T., Xia, P. and Xia, X. G 2016. Hierarchical codebook design for beamforming training in millimeter-wave communication. *IEEE Transactions on Wireless Communications*, 15(5), pp. 3380-3392, which is incorporated herein by reference. In some embodiments, the algorithm is run multiple times, with random starts, and the best codebook is chosen from among the respective codebooks that result from the runs.

The assigning of the training points (at 130) may be performed as follows. In each iteration, the training point $h_l$ may be assigned to a codeword $w_k$, where $$k = \underset{j=1,\ldots,K}{\operatorname{argmax}} |w_j^H h_l|^2.$$

In some embodiments, the number of training points may exceed (e.g., may greatly exceed, by a factor of 1000 or more) the number of codewords, so that each codeword may have assigned to it (at 130), multiple (e.g., a large number of) training points.

The updating of the codewords (at 140) may be performed as follows. In each iteration, the kth codeword is updated as: $w_k^{updated} = \operatorname{argmax}_w J_k(w)$, where $$J_k = \frac{1}{|\Omega_k|} \sum_{h_l \in \Omega_k} f(|w^H h_l|^2),$$

and $\Omega_k = \{h_l \mid |w_k^H h_l|^2 > |w_j^H h_l|^2, j=1, \ldots, K-\{k\}\}$ (e.g., $\Omega_k$ is the set of training points assigned to the codeword (at 130)). The metric function $f(.)$ may be any function, including, for example, $f(x)=x$ (a measure of average beamforming gain), $f(x)=\log(x)$ (a measure of capacity), $f(x)=Q(x)$ (a measure of "reciprocal bit error rate" i.e., a measure of the reciprocal of the bit error rate (BER)) and $f(x)=\operatorname{sign}(x>y)$ (a measure of coverage). The maximization involved in finding $w_k^{updated} = \operatorname{argmax}_w J_k(w)$ may be performed as follows. This maximization may involve finding the codeword that maximizes:

$$J_k = \frac{1}{|\Omega_k|} \sum_{h_l \in \Omega_k} f(|w^H h_l|^2) \text{ s.t. } w(n) = e^{j\theta(n)}, n = 1, \ldots, N$$

where $f(.)$ may be any suitable metric function (examples of which are mentioned above). A gradient descent method may be used to update the codewords in each iteration. Such a gradient descent method may be employed with any differentiable function. The derivative of $J_k$ with respect to the vector $\theta_k$ may be denoted as:

$$\frac{\partial J_k}{\partial \theta_k} = \frac{1}{|\Omega_k|} \sum_{l=1}^{|\Omega_k|} \frac{\partial f}{\partial x} \frac{\partial x}{\partial w_k} \frac{\partial w_k}{\partial \theta_k}$$

This expression, $$\frac{\partial J_k}{\partial \theta_k}$$

may be calculated as:

$$\frac{\partial J_k}{\partial \theta_k} = \frac{1}{|\Omega_k|} \sum_{l=1}^{|\Omega_k|} f'(|w_k^H h_l|^2) w_k^H h_l h_l^H \Theta_k$$

where $\Theta_k$ is a diagonal matrix whose nth diagonal element is equal to $je^{j\theta_k(n)}$. Then, the corresponding codeword may be updated iteratively (e.g., $N_{iter}=100$) using a gradient descent algorithm as $$\theta_k^{(i+1)} = \theta_k^{(i)} + \epsilon \frac{\partial J_k}{\partial \theta_k^{(i)}},$$

where $\epsilon$ is the step size, which may be tuned, for example, to balance speed of convergence against stability. In some embodiments, another iterative method, e.g., a stochastic gradient descent algorithm, is used instead of the gradient descent method described above.

As such, the updating (at 140) of the codeword for each set of assigned training points, $\Omega_k$, k=1, ..., K, may include repeating the gradient descent updating rule, $$\text{i.e., } \theta_k^{(i+1)} = \theta_k^{(i)} + \epsilon \frac{\partial J_k}{\partial \theta_k^{(i)}}$$

for $N_{iter}$ iterations.

Figure 2:
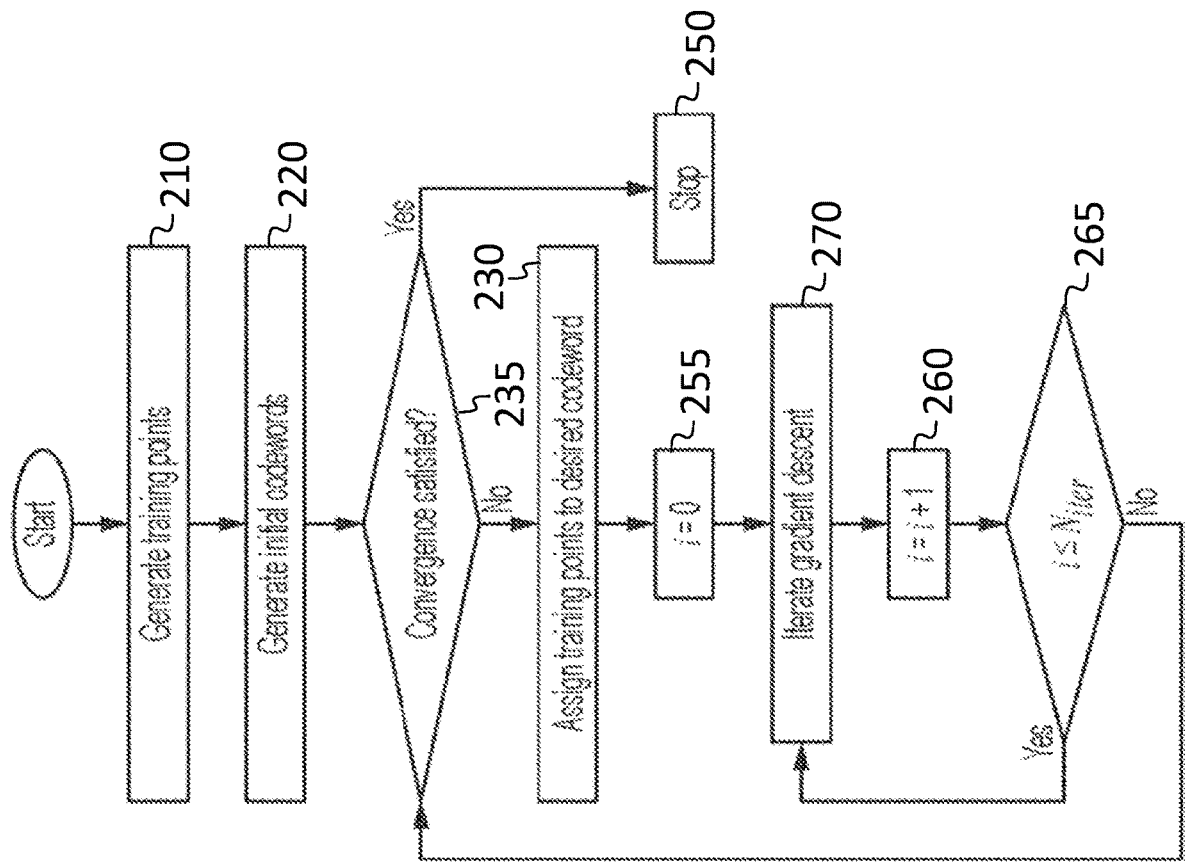
FIG. 2 is a flowchart of another method for generating a codebook, according to an embodiment of the present disclosure.

FIG. 2 shows this process, in some embodiments, the present system generates L training points of $h_l$, l=1, ..., L (at 210). The present system generates a plurality of initial values for a respective plurality of codewords, $w_k$, k=1, ..., K (at 220). The present system tests (at 235 whether convergence is achieved, or "satisfied", and repeats steps 230, 255, 270, 260, and 265 until it is. In step 230, the present system assigns each of the training points to a respective "desired" codeword using the assigning rule:

$$\max_{k=1,\ldots,K} |w_k^H h_l|^2, l = 1, \ldots, L.$$

A loop counter is used in steps 255, 260, and 265 to iterate an inner loop a set number of times ($N_{iter}$). Each iteration of the inner loop executes, at 270, the gradient descent updating rule, $$\text{i.e., } \theta_k^{(i+1)} = \theta_k^{(i)} + \epsilon \frac{\partial J_k}{\partial \theta_k^{(i)}}$$

once. The present system stops (at 250), if convergence is achieved, outputting the final codebook, $\{w_k\}$, k=1, ..., K; if convergence is not achieved, the present system returns to the step of assigning (at 230) each of the training points to a respective "desired" codeword.

The determination of whether convergence is achieved (or "satisfied") (at 150 in FIG. 1, or at 235 in FIG. 2) may be implemented in different ways, including (i) determining whether the number of iterations (e.g., of steps 130 through 150 in FIG. 1) equals a pre-defined number (ii) determining whether the metric to be optimized (i.e., the value $J=E_h\{f (\max_{k=1,\ldots,K}|w_k^H h|^2)\}$) is larger than a pre-defined value, (iii) determining whether the change in this metric, between two successive iterations, is smaller than a pre-defined threshold, and (iv) determining whether the change in the codebook, between two successive iterations, is smaller than a pre-defined threshold.

For example, a codebook which maximizes the coverage may be designed as follows. The maximizing of the coverage may be defined as:

$$J = \Pr_h\{\max_{k=1,\ldots,K}|w_k^H h|^2 > \gamma\}$$

$$\text{s.t.} w_k(n) = e^{j\Theta_k(n)}, n=1,\ldots,N$$

where γ is a performance threshold specified by the system requirements (when $$\gamma = 10^{(-\frac{x}{10})}N,$$

J and 1−J may be referred to as xdB-coverage and xdB-outage, respectively). To be able to adapt the proposed algorithm to the objective function corresponding to coverage, it may be rewritten as follows:

$$J = \frac{1}{L}\sum_{l=1}^{L}\text{sign}\left(\max_{k=1,\ldots,K}|w_k^H h_l|^2 - \gamma\right) \text{ where } (x) = \begin{cases} 1 & x \geq 0 \\ 0 & x < 0 \end{cases}.$$

The sign(x) function is not differentiable; accordingly it may be approximated by a sigmoid function defined as:

$$\text{sigmoid}(x) = \frac{1}{1+e^{-\alpha x}},$$

where α is a metric to adjust the steepness of the curve. Thus, the algorithm can be applied by substituting $f(x)=\text{sigmoid}(x-y)$.

In practice, phase shifters may be able to take only quantized values. For example, if the value of each phase shifter is specified by B bits, the codebook vectors may only be chosen from $2^{NB}$ feasible quantized vectors. In other words, if the value of each phase shifter is specified by B bits, and there are N phase shifters, the feasible set W(N), with an infinite number of entries, is reduced to a quantized set with $2^{NB}$ entries. As such, one solution for designing the desired codebook with K codewords would be an exhaustive search over all $$\binom{2^{NB}}{K}$$

combinations of feasible vectors to choose the best combination which optimizes the metric. However, the complexity of such an exhaustive method hinders the practicality of this method. Therefore, to design the codebook the projection approximation may be combined with the method of steps 110-150 (FIG. 1). In particular, at the end of each iteration, the found codewords may be projected to the closest vectors in the feasible set of quantized vectors. In addition, to avoid divergence, the codeword may only be updated when the new feasible option is better than the previous feasible option.

Some embodiments may provide a method for generating a codebook without imposing (unlike some alternate codebook design approaches) any particular structure on the beam vectors and their patterns, and which (unlike some alternate codebook design approaches) optimizes the performance according to the metric:

$$J=E_h\{f(\max_{k=1,\ldots,K}|w_k^H h|^2)\},$$

$$\text{s.t.} w_k(n)=e^{j\theta_k(n)}, n=1,\ldots,N.$$

In some embodiments, the method described herein may be employed to generate both receive and transmit codebooks, resulting in improvements in one or more performance characteristics (for receiving or transmitting), e.g., average beamforming gain, capacity, bit error rate, or coverage.

Figure 3:
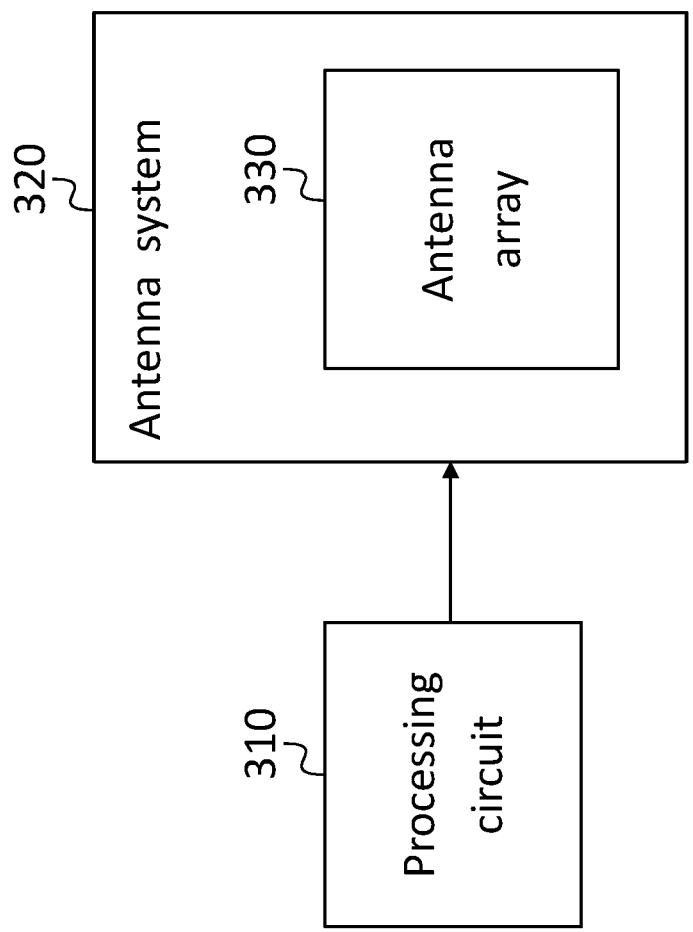
FIG. 3 is a block diagram of a system for receiving or transmitting communication signals, according to an embodiment of the present disclosure.

FIG. 3 shows a system including a processing circuit 310 (discussed in further detail below), configured to generate a codebook according to some embodiments. The processing circuit 310 generates the codebook and feeds it to an antenna system 320, in which it controls an array of phase shifters each controlling the phase of a respective antenna of an antenna array 330.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the present disclosure.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for generating a codebook for analog beamforming have been specifically described and illustrated herein, many modifications and variations will be apparent to those skilled in the art. Accordingly, it is to be understood that a system and method for generating a codebook for analog beamforming constructed according to principles of this disclosure may be embodied other than as specifically described herein. The present disclosure is also defined in the following claims, and equivalents thereof.

What is claimed is:

1. A method of designing a codebook for analog beamforming, the method comprising:
   generating a plurality of training points, each training point being a channel vector;
   generating, for each of a plurality of codewords, a respective initial value;
   assigning, in a first assignment operation, each of the training points to a respective desired codeword, the desired codeword maximizing a metric function of a beamforming gain for the training point over the codewords;
   updating, in a first updating operation, each of the codewords according to the training points assigned to each corresponding codeword, the updating comprising executing a plurality of iterations of a gradient descent updating rule; and
   repeating the assigning and the updating until convergence is achieved.

2. The method of claim 1, wherein the generating of a plurality of training points comprises generating a plurality of training points, based on a predefined distribution.

3. The method of claim 1, further comprising determining whether convergence is achieved.

4. The method of claim 3, further comprising, in response to determining that convergence is achieved, determining the codebook containing the updated codewords.

5. The method of claim 4, further comprising,
   in response to determining, after the first updating operation, that convergence is not achieved,
   assigning, in a second assignment operation, each of the training points to a respective desired codeword, the desired codeword maximizing a metric function of a beamforming gain for the training point over the codewords; and
   updating, in a second updating operation, each of the codewords according to the training points assigned to it.

6. The method of claim 3, wherein the determining whether convergence is achieved comprises determining one from a combination of:
   whether a number of iterations equals a set number;
   whether a metric is larger than a set value;
   whether a change in a metric, between two successive iterations, is smaller than a set threshold; and
   whether a change in the plurality of codewords between two iterations is smaller than a set threshold.

7. The method of claim 1, wherein the generating, for each of the plurality of codewords, the respective initial value, comprises performing a discrete Fourier transform.

8. The method of claim 1, wherein the metric function returns one or more measures selected from a combination of, a measure of average beamforming gain, a measure of capacity, a measure of reciprocal bit error rate, and a measure of coverage.

9. The method of claim 1, wherein the updating, of a codeword of the plurality of codewords, comprises updating a value of the codeword to:

$$w_k^{updated} = \operatorname*{argmax}_{w} J_k(w),$$

wherein:

$$J_k = \frac{1}{|\Omega_k|} \sum_{h_l \in \Omega_k} f(|w^H h_l|^2),$$

and $\Omega_k$ is the set of training points assigned to the codeword.

10. A method of designing a codebook for analog beamforming, the method comprising:
    generating a plurality of training points, each training point being a channel vector;
    generating, for each of a plurality of codewords, a respective initial value;
    assigning, in a first assignment operation, each of the training points to a respective desired codeword, the desired codeword maximizing a metric function of a beamforming gain for the training point over the codewords; and
    updating, in a first updating operation, each of the codewords according to the training points assigned to each corresponding codeword, the updating comprising executing a plurality of iterations of a gradient descent updating rule, wherein the training points include one selected from a combination of:
empirical points;
points uniformly distributed over a sphere;
pseudorandom points generated based on a uniform spherical distribution;
points uniformly distributed over a range of horizontal angles and uniformly distributed over a range of down-tilt angles; and
pseudorandom points generated based on a distribution that is uniform over a range of horizontal angles and uniform over a range of down-tilt angles.

11. A system for communicating, comprising:
an antenna system, comprising a plurality of antennas and a corresponding plurality of phase shifters,
a processing circuit electrically coupled to the antenna system, wherein the processing circuit is configured to:
generate a plurality of training points, based on a predefined distribution, each training point being a channel vector;
generate, for each of a plurality of codewords, a respective initial value;
assign, in a first assignment operation, each of the training points to a respective desired codeword, the desired codeword maximizing a metric function of a beamforming gain for the training point over the codewords;
update, in a first updating operation, each of the codewords according to the training points assigned to each corresponding codeword; and
repeat the assigning and the updating until convergence is achieved.

12. The system of claim 11, wherein the predefined distribution includes a uniform distribution.

13. The system of claim 11, wherein the processing circuit is further configured to determine whether convergence is achieved.

14. The system of claim 13, wherein the processing circuit is further configured to, in response to determining that convergence is achieved, determine the codebook containing the updated codewords.

15. The system of claim 14, wherein the processing circuit is further configured to:
in response to determining, after the first updating operation, that convergence is not achieved,
assign, in a second assignment operation, each of the training points to a respective desired codeword, the desired codeword maximizing a metric function of a beamforming gain for the training point over the codewords; and
update, in a second updating operation, each of the codewords according to the training points assigned to it.

16. The system of claim 13, wherein the determining whether convergence is achieved comprises determining one from a combination of:
whether a number of iterations equals a set number;
whether a metric is larger than a set value;
whether a change in a metric, between two successive iterations, is smaller than a set threshold; and
whether a change in the plurality of codewords between two iterations is smaller than a set threshold.

17. The system of claim 11, wherein the generating, for each of the plurality of codewords, the respective initial value, comprises performing a discrete Fourier transform.

18. The system of claim 11, wherein the metric function returns one or more measures selected from a combination of: a measure of average beamforming gain, a measure of capacity, a measure of reciprocal bit error rate, and a measure of coverage.

19. The system of claim 11, wherein the training points include one selected from a combination of:
empirical points;
points uniformly distributed over a sphere;
pseudorandom points generated based on a uniform spherical distribution;
points uniformly distributed over a range of horizontal angles and uniformly distributed over a range of down-tilt angles; and
pseudorandom points generated based on a distribution that is uniform over a range of horizontal angles and uniform over a range of down-tilt angles.

20. The system of claim 11, wherein the updating, of a codeword of the plurality of codewords, comprises updating a value of the codeword to:

$$w_k^{updated} = \mathrm{argmax}_w J_k(w),$$

wherein:

$$J_k = \frac{1}{|\Omega_k|} \sum_{h_l \in \Omega_k} f(|w^H h_l|^2),$$

and
$\Omega_k$ is the set of training points assigned to the codeword.

* * * * *